United States Patent [19]

Bateman

[11] Patent Number: 4,905,000
[45] Date of Patent: Feb. 27, 1990

[54] REACTIVE WINDSHEAR WARNING INSTRUMENT

[75] Inventor: Charles D. Bateman, Bellevue, Wash.

[73] Assignee: Sundstrand Data Control, Inc., Redmond, Wash.

[21] Appl. No.: 34,807

[22] Filed: Apr. 3, 1987

[51] Int. Cl.⁴ .............................................. G08B 23/00
[52] U.S. Cl. .................................. 340/968; 244/181; 340/963; 364/434
[58] Field of Search ...................... 340/968, 963, 962; 364/434, 424; 73/178 R, 178 T; 244/181, 182

[56] References Cited

U.S. PATENT DOCUMENTS

| | | | |
|---|---|---|---|
| 3,427,581 | 2/1969 | Hartman | 340/968 |
| 3,618,002 | 11/1971 | Stinson | 340/968 |
| 3,892,374 | 7/1975 | Lambregts | 364/177 |
| 4,189,777 | 2/1980 | Kuntman | 340/968 |
| 4,318,076 | 3/1982 | Whitfield | 73/178 T |
| 4,567,483 | 1/1986 | Bateman et al. | 340/970 |
| 4,586,140 | 4/1986 | Millen | 340/968 |
| 4,593,285 | 6/1986 | Miller et al. | 340/968 |
| 4,675,823 | 6/1987 | Noland | 340/963 |
| 4,725,811 | 2/1988 | Muller et al. | 340/963 |
| 4,728,951 | 3/1988 | Johnson et al. | 340/968 |

OTHER PUBLICATIONS

*Aviation Week and Space Technology*, "Scientist Suggests Adding Pressure Sensors to LLWAS", Sep. 22, 1986, p. 70.

NOAA Technical Report ERL 430-ESG, "The Crash of Delta Flight 191", Caracena et al., Dec. 1986.

*Primary Examiner*—Joseph A. Orsino
*Assistant Examiner*—Brent A. Swarthout
*Attorney, Agent, or Firm*—Michael S. Yatsko; Trevor B. Joike

[57] ABSTRACT

An instrument (10) is disclosed for an aircraft having a windshear warning system to vary the threshold alarm setting as a function of a thermodynamic property of the air and as a function of local geographic and seasonal conditions. Specifically, a function generator 16 and other circuitry is disclosed. The output from the function generator 16 and other circuitry is then added to a fixed threshold acceleration signal to produce a threshold alarm signal which has a value that is a function of the temperature of the air, in a basic embodiment.

13 Claims, 2 Drawing Sheets

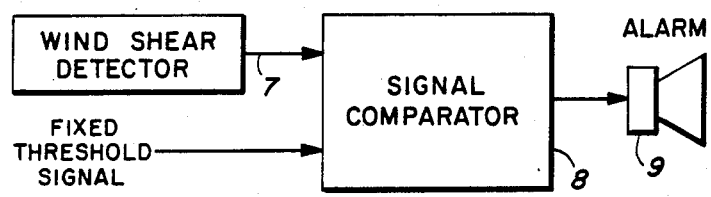
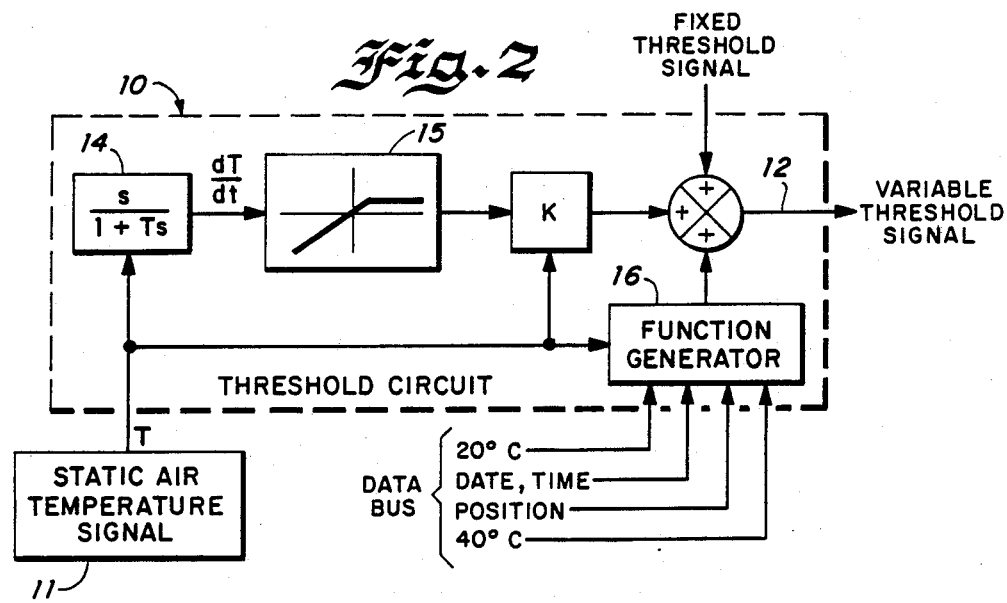
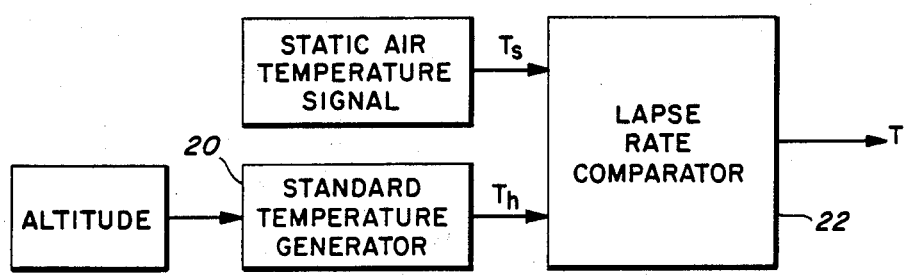
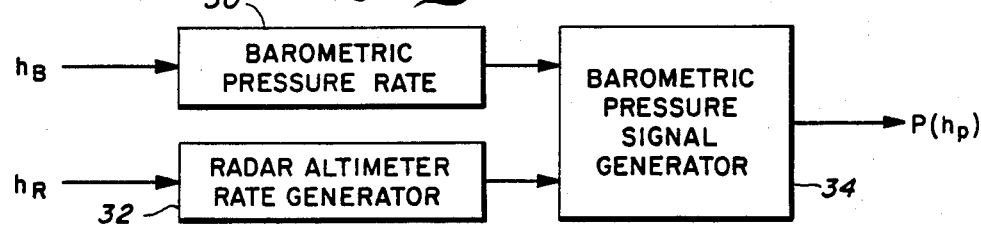

DL-191 DATA

VERTICAL WIND (KT)

STATIC AIR TEMPERATURE (DEG C)

RATE OF CHANGE OF TEMPERATURE (DEG C/SEC)

AIRCRAFT ALTITUDE (FT)

REACTIVE WINDSHEAR WARNING INSTRUMENT

TECHNICAL FIELD

This invention is related to the subject of aircraft instruments, in general, and to the subject of windshear warning systems, in particular.

BACKGROUND OF THE INVENTION

Those skilled in the art are familiar with the principles of windshear and windshear warning systems. For example, there are U.S. Pat. Nos. 3,892,374; 4,053,883 and 4,593,285. These systems are basically "reactive" systems because they cannot sense conditions ahead of the flight path of the aircraft; in that sense, these systems are not predictive or anticipatory of a dangerous windshear condition. They utilize sensors aboard the aircraft to compute air mass acceleration and inertial acceleration, in order to provide a warning of a dangerous windshear condition. Because they are "reactive", they provide a warning only after the aircraft has entered a dangerous downdraft or microburst situation. Thus, these prior art systems provide a short time for the pilot to safely maneuver the aircraft.

Heretofore, warning threshold of a windshear warning system has been established or set as a function of the climb performance of the aircraft. For example, in the case of the Boeing 737 aircraft, the warning threshold is set at approximately 150 mgs (i.e., 1000 mgs=32 ft/sec$^2$); the Boeing 747 aircraft has a setting of approximately 80 mgs (both vertical and horizontal windshear or components thereof). Such threshold settings are basically a compromise between giving a reasonable and timely alert and avoiding nuisance warnings due to mild gusts or slightly turbulent conditions, such as ground turbulence, which may be encountered during a normal take-off and landing. Preferably, a windshear warning system should distinguish between a deadly convective flow (such as a "microburst") and a Fall, windy day when a cold front has recently passed through the area. More importantly, a windshear warning system should anticipate a dangerous condition, rather than simply become responsive to it. A windshear warning system that would not only provide adequate warning but also take in consideration special conditions at the airport of interest, including seasonal and geographic conditions would prove to be a significant contribution to the art and an important advance in flight safety.

SUMMARY OF THE INVENTION

This invention is an improvement over conventional windshear warning systems inasmuch as it incorporates a better understanding of the meteorological phenomena associated with a windshear or microburst condition, thereby improving the margin against unwanted warnings and improving the time for the pilot to react.

In accordance with the present invention, a method and apparatus is disclosed for providing a warning to the pilot of an aircraft of a dangerous windshear condition. Specifically, a thermodynamic property of the air is sensed (i.e., pressure, temperature, etc.), and a signal whose value is a function of that thermodynamic property, is generated and added to a fixed threshold signal to produce a variable threshold signal, the value of which is a function of that thermodynamic property. The variable threshold signal is then used as a basis of comparison against a windshear signal and, in the event that the threshold value is exceeded, an alarm is generated.

In one embodiment, a static air temperature, or the ambient temperature surrounding the aircraft, is used to vary the threshold warning setting for a windshear condition. In another embodiment, the combination of temperature and temperature rate is used to vary the threshold warning condition and thereby improve the signal to noise ratio for detecting a microburst or a windshear associated with frontal passage, thereby discriminating against strong gusts that pose no danger to the aircraft. In still another embodiment, local geographic and seasonal conditions are used to vary the threshold setting.

Many other features and advantages of the invention will become apparent from a discussion which follows.

DESCRIPTION OF THE DRAWINGS

FIG. 1 is an illustration of a basic windshear warning system;

FIG. 2 is a block diagram of the circuit that is the subject of the present invention;

FIG. 3 is a block diagram of a circuit which can be used to correct a static air temperature signal for the atmospheric lapse rate;

FIG. 4 is a block diagram of the circuit used to develop a barometric pressure signal which may be used to vary the windshear threshold warning signal.

DETAILED DESCRIPTION OF THE INVENTION

While this invention may be practiced in many different forms, there will be shown the drawings and will herein be described in detail several specific embodiments of the invention. It should be understood, however, that the present disclosure is to be considered an exemplification of the principles of the invention and is not intended to limit the invention to the specific embodiments described.

Figure 5B:
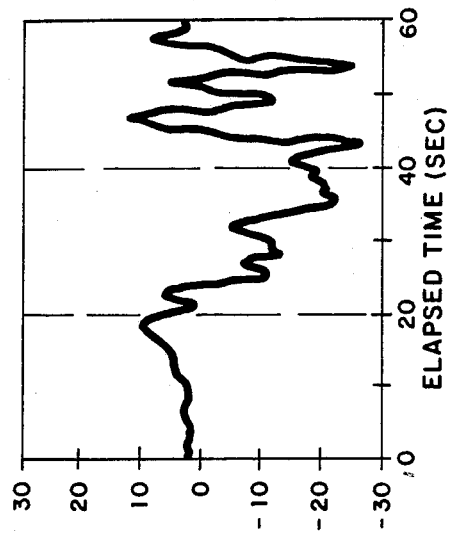
FIGS. 5A through 5D are graphs showing the relationship of temperature in vertical wind of an aircraft encountering a dangerous windshear condition.
Figure 5D:
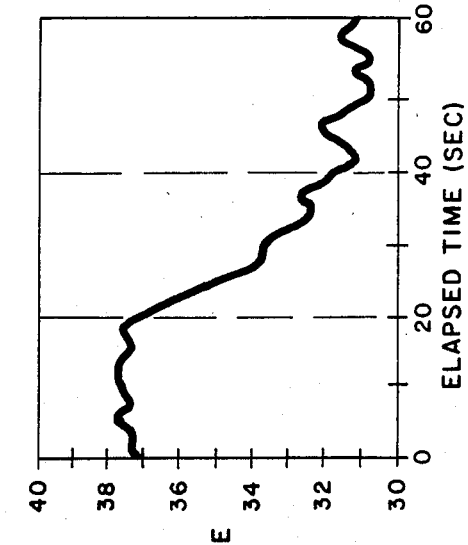
Figure 5A:
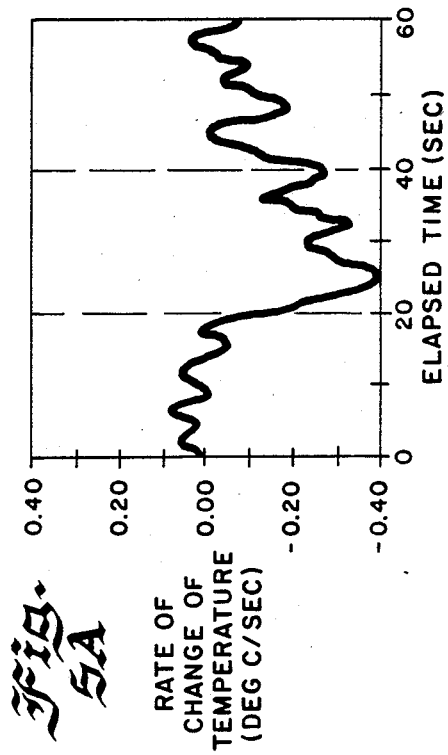
Figure 5C:
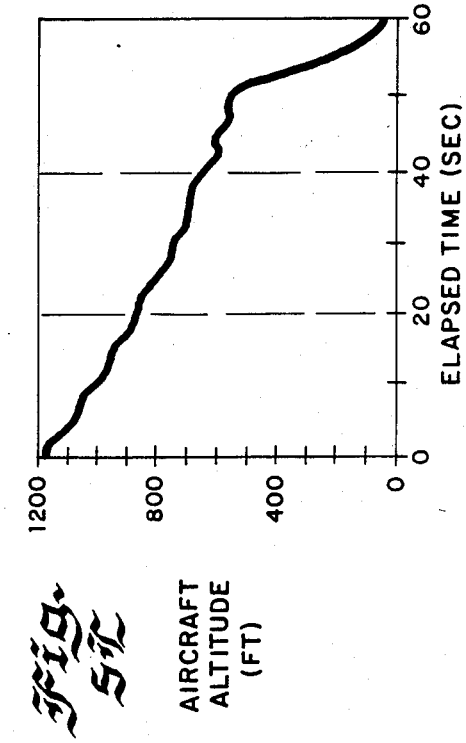

I have studied data available in accident reports and of flight recorders on aircraft that have been in accidents attributable to windshear (see FIGS. 5A through 5D). I have concluded that all accidents, attributable to a dangerous microburst, have been associated with a static temperature between 20 degrees Centigrade and 40 degrees Centigrade. More particularly, the majority have usually been associated with decreasing temperatures, such as that associated with evaporative or cooling air flow (i.e., this is not however always the case as some observations have been made of warm air flow from the surrounding air descending apparently by momentum). Thus, static air temperature (FIG. 5D) and a decreasing temperature rate (FIG. 5A) should be used to vary the threshold warning condition of a windshear warning system.

I have also found that, in some situations, if the air temperature is less than 20 degrees Centigrade, the gain of or the effect of the negative or decreasing rate of temperature should be reduced. This is an important observation in that this may be used to reduce the likelihood of nuisance warnings. Such would be the result when the aircraft is descending into a temperature inversion (i.e., Los Angeles or San Francisco in the Summertime, or Fairbanks, Ak. in the Wintertime, or those airports situated in a valley surrounded by mountains, such as Zurich, Switzerland). Thus, the warning time, or the time to alert the pilot before dangerous convective windshear is encountered, can be improved by decreasing the threshold setting by the negative temperature rate, and temperatures in excess of 20 degrees Centigrade. For example, using the atmospheric information available for the well known Dallas-Ft. Worth L-1011 accident, at least a few seconds of extra warning could have been given the pilot of the aircraft had that aircraft been equipped with a conventional warning system, and the threshold setting means, that is the subject of the present invention.

Turning now to the drawings, FIG. 1 is a block diagram of an elementary windshear warning system. Basically, a signal 7 is generated by a windshear detector that is representative of a windshear condition. That signal 7 is compared against a fixed threshold signal in a signal comparator 8. In the event that the threshold setting is exceeded, an alarm 9, preferably a voice synthesized alarm, is sounded.

In FIG. 2, a block diagram is presented that describes my invention. Basically, a threshold circuit 10 is used to produce a variable signal against which the windshear signal 7 is compared and which is a function of a thermodynamic property of the air. Specifically, FIG. 2 illustrates an embodiment wherein a static air temperature signal 11 is used to generate a variable threshold signal 12. The static air temperature signal "T" is a signal which is readily available on most commercial and larger single engine aircraft. This signal is a mandatory input for most aircraft so that the pilot can monitor for icing conditions, calculate ground speed, calculate maximum engine pressure ratio (EPR), etc. Other means exist for predicting or measuring the temperature of the air in advance of the flight path of the aircraft. See, for example, U.S. Pat. No. 4,342,919 where infrared radiation is used or U.S. Pat. No. 3,856,402 where laser's are used to detect clear air turbulence in advance of the flight path of the aircraft. That temperature signal T is then sent to a filter 14 which differentiates the signal and selects only the long-term components of the temperature signal. I have found that when the air temperature is less than 20 degrees Centigrade, the effect of a decreasing rate of temperature should be reduced insofar as the effect of that negative temperature rate on the threshold setting of a windshear warning system is concerned. Therefore, the temperature rate signal is sent to a limiter or variable gain circuit 15. The limiter 15 has a signal output which is dependent on the rate of change of temperature. The output from that circuit 15 may be scaled and added to a fixed threshold signal to produce a variable threshold signal 12. The result is a signal which varies as a function of the rate of change of the static air temperature.

A further enhancement results by using the static air temperature signal as the input to a function generator 16. That generator produces an output signal which can be a simple linear function of temperature or a more complex function of T (i.e., temperature squared, etc.). The output of the function generator 16, when scaled and added to the fixed threshold signal and the signal which is a function of the rate of change of temperature, is a variable threshold signal which is a more complicated function of static air temperature. This more complicated function should be useful in reducing nuisance alarms.

Since the weather surrounding an airport is dependent on the local geography and the season of the year, there are certain airports where windshear and strong gusts are more likely than at other airports. Thus, the threshold signal should, to be less likely a source of nuisance warnings, be a function of geographic position, the time of day, the season of the year, and other peculiarities of the airport. This I have shown as inputs to the function generator 16. Reference should be made to my U.S. Pat. No. 4,567,483 wherein a Ground Proximity Warning System is disclosed where warning thresholds are dependent, in part, on the particular airport that is being used. Such a system would tailor the warnings to the airport then being used by the pilot and would even prove to be more reliable than the reactive windshear warning systems of the prior art.

Turning now to FIG. 3, those skilled in the art, including licensed pilots, are familiar with the fact that the temperature of a standard atmosphere changes as a function of altitude and, in particular, decreases as the altitude increases. This is commonly referred to as the "lapse rate" (approximately 2.2° C. per 1000 feet). FIG. 3 provides a further refinement of the apparatus shown in FIG. 2 in that the static air temperature signal is corrected for those temperature changes due to an increase in altitude. Specifically, a temperature signal $T_h$ is produced from a circuit 20 as a function of the altitude of the aircraft. Another circuit 22 compares the temperature signal $T_h$ which is a function of altitude against the static air temperature signal $T_s$. The output T is a signal which has been corrected for those changes in temperature due to the lapse rate.

Thunderstorms begin with a cumulus cloud which swells and grows vertically at a rapid rate. In the beginning, moist air is drawn upwardly and cloud droplets grow into super-cooled raindrops as they are swept up beyond the freezing level. As the raindrops grow too large to be supported by the updraught, they fall, dragging the air along and producing a strong downdraught. Dryer outside air is then entrained and cooled as the raindrops evaporate, strengthening the downdraught and generating strong winds and heavy surface precipitation. Strong low-level windshear often occurs in the area of separation between the inflow and outflow of air, also known as the "gust front". The gust front may extend for 18 to 28 kilometers in front of the area of precipitation. The most dangerous form of windshear, the microburst, is an intense downdraught which, upon striking the ground, spreads out into a circular vortex, radiating in all directions. Its unique shape has been described, colloquially, as "an up-side down daisy". I believe that fingers of air radiate from the ground as a result of such a microburst and that these fingers can be sensed and thereby provide an advance warning of the possibility of a microburst or dangerous windshear situation. In particular, the rate of change of barometric pressure as well as temperature may provide an advance warning by modifying the threshold signal which is used to generate an alarm. Since the barometric pressure also decreases as a function of altitude (i.e. 1 inch Hg per 1000 feet), this thermodynamic property, if used to vary the threshold signal, must be corrected for those changes in barometric pressure due to a change in altitude. In FIG. 4, a block diagram is presented for such a circuit. Basically, a signal which is a function of the rate of change of barometric pressure is compared against a signal which is a function of the rate of change of altitude. Any change in barometric pressure not due to a change of altitude must be attributed to a change in the atmospheric conditions surrounding the aircraft. Specifically, a barometric pressure rate generator 30 provides a signal which is a function of the rate of change of barometric pressure. A rate generator 32 provides a signal (i.e., from an inertial navigation unit or inertial reference system or a radar altimeter) which is a function of the rate of change of the altitude of the aircraft above the ground (or inertial vertical speed or absolute altitude over level ground or water). These two signals are fed to a barometric signal generator 34 which produces a signal p which is a function of the barometric pressure ($h_p$) at the altitude of the aircraft. This signal can then be used in a circuit similar to the threshold circuit 10 of FIG. 2 to vary the threshold warning signal It should be understood that no limitation with respect to the specific apparatus illustrated herein is intended or should be inferred. It is, of course, intended to cover, by the appendent claims, all such modifications as fall within the scope of the claims.

I claim:

1. In an aircraft having means for providing a signal representative of a windshear condition; means for providing a temperature signal representative of the temperature of the air through which the aircraft is flying and the rate of change of the temperature representative signal; and means for providing a warning in the event that the signal representative of a windshear condition exceeds a threshold signal, the improvement comprising:

threshold setting means for decreasing the value of the threshold signal when the rate of change of the temperature representative signal is decreasing. further including means for providing a signal representative of the time and date; and means for biasing said threshold setting means to lower said threshold signal for predetermined ranges of times and dates.

2. The apparatus as set forth in claim 1, wherein said threshold setting means comprises:

(a) a function generator, using the temperature signal, for generating a temperature dependent signal whose value is a function of the temperature of the air; and (b) means for adding said temperature dependent signal to a fixed threshold signal to produce a threshold signal having a alue which is a function of the temperature of the air.

3. The apparatus according to claim 1, wherein said threshold setting means comprises:

(a) a function generator, using the temperature signal, for generating a first temperature dependent signal whose value is a function of the temperature of the air;

(b) means, using the temperature signal, for producing a second temperature dependent signal which is a function of the rate of change of the temperature of the air; and (c) means for adding said first temperature dependent signal and said second temperature dependent signal to a fixed threshold signal.

4. An instrument for an aircraft, having a source of signals representative of the temperature of the air, means responsive to flight path parameters for producing a signal representative of a windshear condition and means for producing a warning signal when said windshear representative signal exceeds a predetermined threshold signal, the improvement comprising:

(a) rate means responsive to the air temperature representative signal for producing a rate signal representative of the rate of change of the temperature of the air;

(b) combining means for combining said rate signal and said predetermined threshold signal and generating a variable threshold signal before said predetermined threshold signal for a predetermined range of rate signals; and (c) means for comparing said variable threshold signal to said windshear signal and for producing a warning in the event that said variable threshold signal is exceeded further including means for providing a signal representative of the time and date; and means for biasing said warning signal to lower said predetermined threshold signal for predetermined ranges of times and dates.

5. The instrument as set forth in claim 4, wherein said combining means comprises:

(a) a function generator for producing a first output signal whose value is a function of the temperature signal;

(b) limiting means, at the output of said rate means, for limiting the value of said rate signal in a predetermined temperature range and for producing a second output signal; and (c) a summing junction for adding said fixed threshold signal, said first signal and said second signal to produce said variable threshold signal.

6. The instrument of claim 5, wherein said limiting means includes a limiter and means for scaling the output of said limiter.

7. The warning system set forth in claim 1, wherein said threshold setting means is also responsive to said temperature representative signal and is decreased by a predetermined amount as a function of the altitude of the aircraft to account for temperature changes due to increases in altitude to increase the sensitivity of the warning system.

8. The warning system set forth in claim 1 wherein said threshold setting means includes means for lowering the value of the threshold signalf or a predetermined geographic position of the aircraft which indicates a windshear condition is probable.

9. A method for enhancing the sensitivity of a windshear warning, wherein a warning signal is generated when a signal representative of a windshear conditions exceeds a threshold value; the improvement comprising the steps of:

(a) producing a signal whose value is representative of the air temperature of the air in the flight path of the aircraft;

(b) producing a rate signal whose value is representative of the rate of change of said air temperature;

(c) generating a first signal whose value is a function of said signal representative of said air temperature;

(d) generating a second signal whose value is a function of said rate signal;

(e) adding said first signal and said second signal and said threshold value to produce a comparison signal; and (f) producing a warning in the event that the value of said windshear condition signal exceeds said comparison signal; further including means for providing a signal representative of the time and date; and means for biasing said warning signal to lower said threshold value for predetermined ranges of times and dates.

10. The method set forth in claim 9, wherein said signal whose value is representative of a thermodynamic property of the air is a static air temperature signal.

11. The method set forth in claim 10, wherein said step of generating said first signal includes the step of decreasing said signal representative of the static air temperature for increases in the altitude of the aircraft.

12. The method set forth in claim 9, wherein said comparison signal is decreased for a geographic position of the aircraft which indicates a windshear condition is probable.

13. An aircraft instrument having means for providing a signal representative of a windshear condition and means for providing a warning in the event that the windshear representative signal exceeds a predetermined threshold signal, wherein said threshold signal is based on the geographic position of the aircraft, the improvement comprising:
   (a) means for providing a temperature signal representative of the temperature of the air through which the aircraft is flying;
   (b) means for providing a warning in the event that said signal representative of a windshear condition exceeds a threshold condition; and
   (c) threshold setting means for lowering the value of said threshold condition when said temperature is in a predetermined range further including means for providing a signal representative of the time and date; and means for biasing said threshold setting means to lower said threshold condition for predetermined ranges of times and dates.

* * * * *